(12) United States Patent
Silfverberg et al.

(10) Patent No.: US 6,961,564 B2
(45) Date of Patent: Nov. 1, 2005

(54) METHOD FOR ENABLING A SUBSCRIBER ENTITY TO ACTIVELY COMMUNICATE IN A COMMUNICATION NETWORK

(75) Inventors: Kari Silfverberg, Mouhijärvi (FI); Timo Aaltonen, Tampere (FI); Anna-Maija Havela, Julkujärvi (FI); Keijo Ekola, Tampere (FI); Petteri Mandelin, Tampere (FI)

(73) Assignee: Nokia Corporation, Espoo (FI)

( * ) Notice: Subject to any disclaimer, the term of this patent is extended or adjusted under 35 U.S.C. 154(b) by 162 days.

(21) Appl. No.: 10/477,395

(22) PCT Filed: May 16, 2001

(86) PCT No.: PCT/EP01/05582

§ 371 (c)(1),
(2), (4) Date: Nov. 12, 2003

(87) PCT Pub. No.: WO02/098156

PCT Pub. Date: Dec. 5, 2002

(65) Prior Publication Data

US 2004/0157601 A1   Aug. 12, 2004

(51) Int. Cl.⁷ .............................................. H04Q 7/20
(52) U.S. Cl. .................... 455/432.3; 455/411; 455/558
(58) Field of Search ........................ 455/410, 411, 418, 455/419, 433, 450, 464, 558, 560, 515, 403, 455/432.3, 432.2, 435.1

(56) References Cited

U.S. PATENT DOCUMENTS 5,557,655 A * 9/1996 Lantto ........................ 455/433
5,884,168 A * 3/1999 Kolev et al. .............. 455/432.1
5,915,225 A * 6/1999 Mills ........................... 455/558
6,014,561 A   1/2000 Mölne
6,038,445 A * 3/2000 Alperovich et al. ...... 455/432.1
6,188,899 B1  2/2001 Chatterjee et al.
6,212,372 B1* 4/2001 Julin .......................... 455/418

(Continued)

FOREIGN PATENT DOCUMENTS

EP        0 820 207 A2   1/1998
WO        WO 99/07173    2/1999

*Primary Examiner*—Sonny Trinh
(74) *Attorney, Agent, or Firm*—Squire, Sanders & Dempsey LLP (57) ABSTRACT

The present invention proposes a method for enabling a subscriber entity to actively communicate in a communication network, a subscriber entity being identified by at least one assigned subscriber identity (IMSI, MSISDN), said communication network comprising at least one database entity of a first type (5a, 5b) keeping a first record of data of subscriber entities enabled to actively communicate in a communication network, the method comprising the steps of: storing said at least one assigned subscriber identity of at least one subscriber entity not enabled to actively communicate in said communication network in a database entity (4) of a second type, informing (S2a, S2b) said database entity (4) of said second type about a need to enable said at least one not enabled subscriber entity to actively communicate in said communication network, and, upon being informed, transferring (S3) information related to a subscriber entity not enabled, from said database (4) of said second type to a selected one (5b) of said at least one database entity of said first type (5a, 5b). Also, the present invention proposes an accordingly adapted database entity of the above mentioned second type and a register entity for interaction with said database entity of said second type.

9 Claims, 3 Drawing Sheets

U.S. PATENT DOCUMENTS

| | | |
|---|---|---|
| 6,345,184 B1 * | 2/2002 | van der Salm et al. .. 455/432.2 |
| 6,370,379 B1 * | 4/2002 | Rugaard ................. 455/435.1 |
| 6,745,029 B2 * | 6/2004 | Lahtinen et al. ......... 455/432.1 |
| 2003/0233329 A1 * | 12/2003 | Laraki et al. ................. 705/52 |
| 2005/0108417 A1 * | 5/2005 | Haumont .................... 709/232 |

\* cited by examiner

METHOD FOR ENABLING A SUBSCRIBER ENTITY TO ACTIVELY COMMUNICATE IN A COMMUNICATION NETWORK

FIELD OF THE INVENTION

The present invention relates to a method for enabling a subscriber entity to actively communicate in a communication network.

BACKGROUND OF THE INVENTION

In the recent years, communication networks and especially mobile communication networks became increasingly popular. With this popularity, the number of users and/or subscribers having subscribed to communicate via such communication networks has correspondingly increased. Examples for such communication networks are the GSM network or the currently being developed UMTS network. However, the present invention is not limited to be applied to these networks, but any other communication network requiring a subscriber data management (and subscriber activation) may be suitable for the present invention to be applied thereto. Only for descriptive purposes, the present application refers to a terminology known from GSM and/or UMTS networks.

Such networks generally consist of an access network (a radio access network in case of a mobile communication network) and a core network. The core network, being independent of connection technology of the terminal (e.g. radio or wired), manages connections for specific users. To this end, a switching means known as mobile switching center MSC is provided in the core network. Such a MSC may either be a GSM MSC or a UMTS MSC. Note that if the network is an IP multimedia network (IP=Internet Protocol), the network also comprises call processing servers (CPS) or call state control functions (CSCF) by means of which calls are set up in the network. Still further, the core network comprises at least one database entity known as home location register HLR in GSM or as home subscriber server HSS in UMTS. The home subscriber server HSS and/or the home location register HLR is the master database for a given user. It is the entity containing the subscription related information to support the network entities actually handling calls/sessions, such as the MSC and others. The HLR/HSS is thus responsible for holding for example the following user related information:

user identification, numbering and addressing information
user security information: network access control information for authentication and authorization
user location information at intersystem level, HSS/HLR handles the user registration and stores intersystem location information and so on,
the user profile (services, service specific information)

A subscriber entity is not enabled to actively communicate in the communication network unless it is registered in a HLR/HSS of said communication network. Stated in other words, only those subscriber entities are enabled to actively communicate in a communication network, the data of which are kept in a record of the HLR/HSS as a database entity of a first type of the communication network. It is to be noted that in the present description, the subscriber entity corresponds to e.g. a SIM (subscriber identity module) card of GSM or UMTS. The subscriber entity is activated in a terminal to enable communication with the network in the role of the subscriber entity. Hitherto, if a new customer as a new subscriber to the network newly subscribed to the network of and/or bought a new subscriber entity (presumably together with a terminal) from the network operator, it was the responsibility of the operator to create the data needed for the new subscriber to be available in the HLR/HSS database entity. Stated in other words, the purchase of the mobile equipment (the phone itself) is totally independent of the purchase of the SIM card. This may or may not happen when the mobile equipment itself is purchased.

An operator usually receives a certain batch of SIM cards from SIM manufacturer. These SIM cards typically belong to an IMSI number range indicated by the operator to the manufacturer prior to the order of the SIM card batch. There is usually no programming (of the cards) necessary after the cards have been delivered by the manufacturer to the operator.

Hereafter, there exist essentially two options with regard to the subscriber data addition to the registers:

(1) subscriber data on unpurchased subscriptions (i.e. SIM cards) is stored in advance to the HLR prior to the purchase of the subscription from the operator. This may happen e.g. when the batch of SIM cards is received from the SIM card manufacturer. When a subscription is actually purchased by an end user, it is merely marked as active in the registers. This causes a waste of register capacity; More precisely, if the network operator thus creates subscribers, i.e. subscriber data, to be readily available in the HLR/HSS database, this implies that the network operator will have to provide for the required infrastructure of the network also for those subscribers only present by corresponding subscriber data in the HSR/HSS database, but which do not yet correspond to an actual subscriber, i.e. a customer that has signed a contract with the network operator to become a subscriber and which actively uses the infrastructure provided for. Thus, this is inconvenient for a network operator since he has to provide for communication network capacity not used.

(2) subscriber data corresponding to a newly purchased subscription is created to the HLR by the operator shortly after the purchase of the subscription (i.e. SIM card). The IMSI corresponding to the SIM card is created to the HLR along with the rest of the created subscriber data. This causes a delay in the availability of the subscription.

Stated on other words, the creation of the newly required subscriber data may take quite a time before the new subscriber receives his subscriber entity, i.e. subscriber identity module SIM and/or USIM (UMTS SIM) which he has to insert into his terminal in order that this can be operated. The subscriber identity module could be sent to the shop where the subscriber bought his subscriber terminal and he is informed that he may come to the shop to have the subscriber identity module delivered to him. Thus, the subscriber has to come twice to the shop which causes a further inconvenience to him.

Alternatively, new subscriber data may be created via a fast data connection from the shop to the core network, e.g. the HLR/HSS in order to create the needed information. Nevertheless, even with a "fast connection", such a process may still take a couple of hours and it is rather inconvenient for a customer, to wait for such a long time in the shop and/or to return to the shop after waiting that time. Still further, creating the data at the core network does not prevent the necessity for the subscriber identity module SIM to be created with the subscriber's information created. Therefore, in such a case each shop would have to be equipped with a corresponding equipment for programming subscriber identity modules with created subscriber data.

This, however, would be inconvenient for the network operator from the point of view of additionally arising costs for such equipment.

SUMMARY OF THE INVENTION

Consequently, it is an object of the present invention to provide a method for enabling a subscriber terminal to actively communicate in a communication network, which is free from the above drawbacks and which is convenient for a customer as well as for a network operator.

According to the present invention, this object is for example achieved by a method for enabling a subscriber entity to actively communicate in a communication network, a subscriber entity being identified by at least one assigned subscriber identity, said communication network comprising at least one database entity of a first type keeping a first record of data of subscriber entities enabled to actively communicate in a communication network, the method comprising the steps of: storing said at least one assigned subscriber identity of at least one subscriber entity not enabled to actively communicate in said communication network in a database entity of a second type, informing said database entity of said second type about a need to enable said at least one not enabled subscriber entity to actively communicate in said communication network, and, upon being informed, transferring information related to a subscriber entity not enabled, from said database of said second type to a selected one of said at least one database entity of said first type.

According to further developments of the present invention, said communication network further comprises a register entity keeping a third record including enabled and not enabled subscriber entities, said second record comprising, for each subscriber entity, said at least one assigned subscriber identity and an indication that said subscriber identity has been transferred to a selected one of said at least one database entity of said first type, said method comprising a further step of: setting said indication for said subscriber identity that has been transferred to a selected one of said at least one database entity of said first type;

said indication comprises an identification of said database entity of said first type to which said transfer has been effected;

said step of informing comprises requesting a location update by said at least one not enabled subscriber entity, detecting, at said register entity, that said location update request origins from a subscriber entity for which an indication that said subscriber identity has been transferred to a selected one of said at least one database entity of said first type, is not present in said second record, and in response thereto triggering said database entity of said second type for performing said transfer;

said step of informing comprises issuing an enabling request to said database entity of said second type triggering said database entity of said second type for performing said transfer;

said enabling request is issued from a remote location at which a subscriber subscribes to said communication network;

said database entity of said first type to which said transfer is performed, is selected according to the still available database storage capacity;

said database entity of said first type to which said transfer is performed, is selected according to a service profile assigned to a subscriber entity of a subscriber.

Still further, according to the present invention this object is for example achieved by a database entity of a second type in a communication network, comprising: storage means adapted to store at least one assigned subscriber identity of at least one subscriber entity not enabled to actively communicate in said communication network, receiving means adapted to receive a request indicating that a specific one of said at least one assigned subscriber identity of at least one subscriber entity not enabled is to be enabled, selection means adapted to select, based on said request, said specific one of said subscriber identities from said storage means, and transmission means adapted to transfer said selected specific one of said subscriber identities to a selected database entity of a first type of said network.

According to a favorable further refinement of said database entity said transmission means is further adapted to send an indication of said selected specific one of said subscriber identities being transferred to a selected database entity of said first type of said network, to a register entity of said network.

Also, according to the present invention this object is for example achieved by a register entity in a communication network, comprising: storage means keeping a record including information related to enabled and not enabled subscriber entities, said record comprising, for each subscriber entity, said at least one assigned subscriber identity and an indication whether said subscriber identity has been transferred to a selected one of at least one database entity of a first type, receiving means adapted to receive a request for a location update by at least one subscriber entity, detection means adapted to detect whether said location update request origins from a not enabled subscriber entity for which said indication that said subscriber identity has been transferred to a selected one of said at least one database entity of said first type, is not set in said record kept at said storage means, and transmission means, responsive to said detection means, adapted to trigger a database entity of a second type of said communication network storing said at least one assigned subscriber identity of said at least one subscriber entity not enabled to actively communicate in said communication network, to transfer information related to said subscriber identity not enabled to a selected database entity of said first type of said network.

According to a respective favorable further refinement of said register entity said receiving means is further adapted to receive a request for setting said indication for said subscriber identity that has been transferred to a selected one of said at least one database entity of said first type;

said register entity further comprises routing means adapted to route the location update request to a corresponding database entity of said first type to which the subscriber identity has been transferred, based on said set indication.

Generally spoken, the above presented database entity of a second type and the register entity are adapted to suitably interact with each other and are adapted so as to perform the method according to the present invention as outlined above and as described in greater details herein below.

By virtue of the present invention, an operator of a communication network is advantageously able to extend its infrastructure only when it is really needed so that there is no need to provide all database capacity (at home location registers HLR, home subscriber servers HSS at once already from the beginning). Also, the proposed method is convenient for the customer/subscriber as well as for the network operator from a point of waiting time until the subscriber entity is enabled to actively communicate in a communication network. According to a further development, the subscriber entity could be enabled to actively communicate in a communication network also upon subscribing to the communication network at a shop not having an Internet connection to the network operator. In any case, the present invention offers a method for fast and automatically enabling a subscriber entity to actively communicate in a communication network.

BRIEF DESCRIPTION OF THE DRAWINGS

The above and other objects, features and advantages of the present invention will become more fully apparent upon referring to the accompanying drawings, in which.

DETAILED DESCRIPTION OF THE EMBODIMENTS

The present invention will be more readily understood upon referring to the subsequent description of preferred embodiments illustrated in the drawings.

Figure 1:
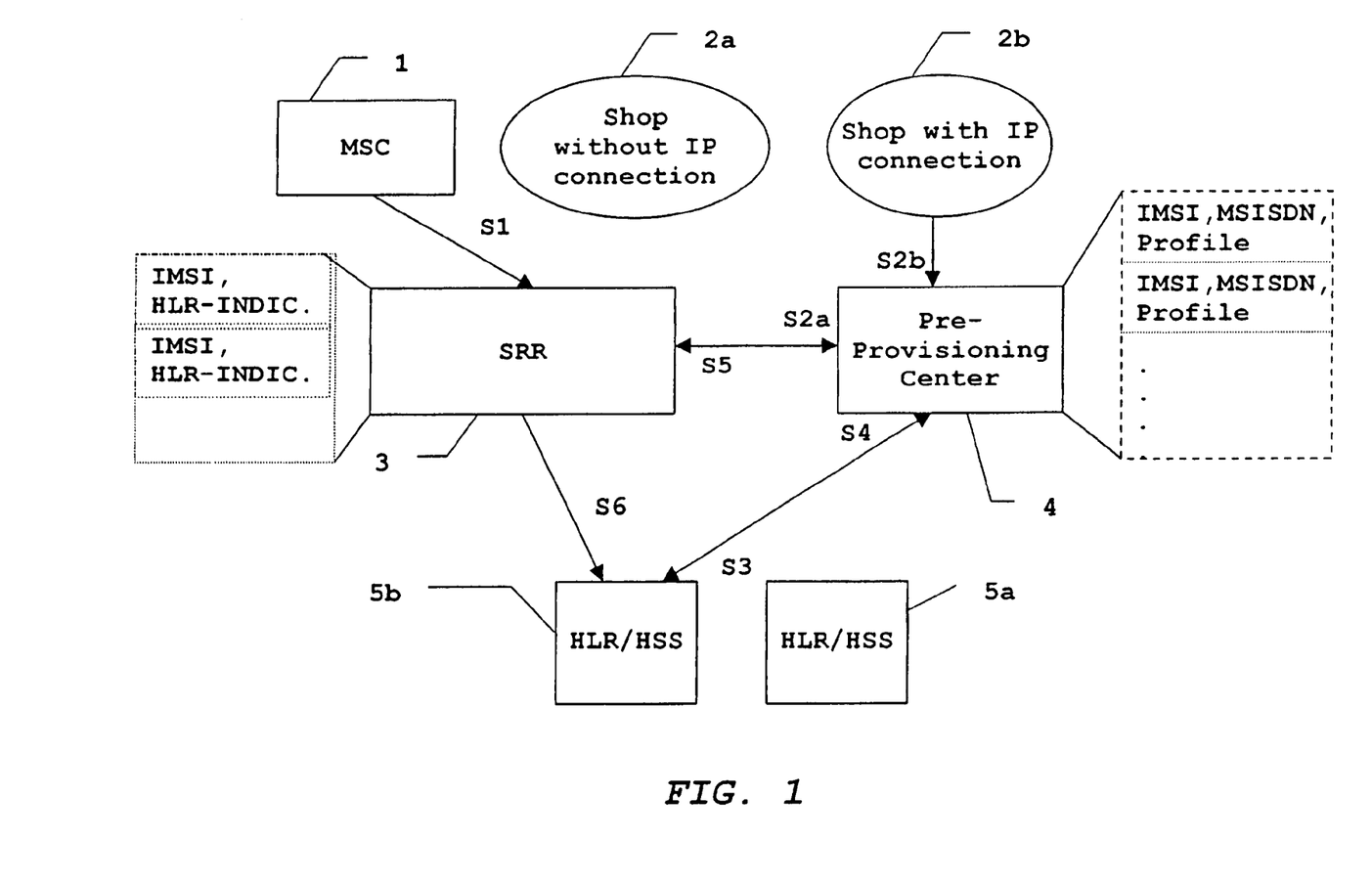
FIG. 1 shows a block diagram of network entities involved in carrying out the present invention and of signaling involved in carrying out the present invention between such network entities.

FIG. 1 shows a block diagram of network entities involved in carrying out the present invention and of signaling involved in carrying out the present invention between such network entities.

It is to be noted that in FIG. 1 arrows denote signaling between individual network entities, while the signaling and/or interfaces between network entities is not limited to the illustrated ones. Rather, signaling and/or interfaces between network entities may take place and/or exist which are not shown in FIG. 1, since in FIG. 1 only those interfaces and signaling are represented, which are related to the present invention as described hereinafter.

In for example many mobile networks the subscriber terminal is divided into two parts: a physical terminal (i.e. a mobile equipment (ME)) and the subscription (i.e. a SIM card) also referred herein as subscriber entity. In other systems there could be a similar separation between a terminal and a subscription/subscriber entity. The subscription could be made active in a terminal e.g. by inserting a smart card corresponding to the subscription or otherwise securely indicating to the terminal that the subscription is to be activated.

A customer wishing to subscribe to a communication network as shown in FIG. 1 may buy his subscription and/or subscriber entity (presumably with but also without a terminal) such as a mobile station MS (not shown) and/or a UMS (UMTS MS, also not shown) from a shop without an IP connection to the network (IP=Internet Protocol) denoted by numeral 2a, or from a shop with an IP connection to the network, denoted by numeral 2b. A subscriber terminal with an activated subscriber entity may establish a connection to a mobile switching center MSC, denoted by 1 for communication with/via the network. The MSC 1 is adapted to communicate with a service routing register SRR denoted by numeral 3. The service routing register represents an example for a register entity keeping a record of a third type including enabled and not enabled subscriber entities, as shown on the left of the SRR 3. This means that the register entity 3 comprises, for each subscriber entity, at least one assigned subscriber identity such as the IMSI (International Mobile Subscriber Identity) and an indication whether said subscriber identity has been transferred to and/or activated at a selected one of at least one database entity of a first type. In FIG. 1 said indication is denoted by HLR-INDIC. A database entity of a first type is a home location register HLR and/or home subscriber server HSS. The communication network comprises at least one of such databases of a first type. Shown in FIG. 1, there are two of such database entities, namely HLR/HSS denoted by 5a and denoted by 5b. The illustration has been restricted to two of such database entities of the first type in order to keep the drawing simple and the explanation short. Nevertheless, more than two HLR/HSS may be present in the network. Each of said database entities of the first type, i.e. HLR/HSS is adapted to communicate with the register entity SRR denoted by 3 as well as with a pre-provisioning center denoted by 4. The pre-provisioning center 4 is an example for a name for a database entity of a second type provided for in said network. This database entity 4 of a second type keeps a record of a second type. In this record of a second type, at least one assigned subscriber identity for at least one subscriber entity which is not enabled to actively communicate in said communication network is stored. As shown on the right hand of the pre-provisioning center 4 as a database entity of a second type, the record maintained therein consists of plural data sets, each data set identifying one subscriber entity by specifying for example the IMSI, the MSISDN (mobile station integrated services digital network number), and a profile assigned to the subscriber terminal. Such a profile could be a profile for business users, ordinary users or teenager users and so on. Each such subscriber recorded in said database entity of a second type corresponds to a subscriber created by the operator for which a corresponding SIM card exists, which SIM card is delivered by the operator to dealers who sell the SIM card (with or without a terminal) to a customer becoming a subscriber to the communication network. The dealer has a list of subscriber identities and profiles which he may sell to customers. The pre-provisioning center 4 as the second type database is adapted to communicate with a shop with an IP connection 2b, with the register entity 3, and with a selected one of the first type databases HLR/HSS, 5a, 5b.

Herein before, a static description of network entities involved in the present invention has been given and also a description of the data records stored therein has been given. Subsequently, the individual method steps performed when carrying out the present invention will be described. In this connection, it is distinguished between two cases:

Case 1: A subscriber buys his SIM card and/or subscriber entity from a shop with IP connection 2b.

Case 2: A subscriber buys his SIM card and/or subscriber entity from a shop without IP connection 2a.

Case 1: Buying a SIM Card from a Shop with IP Connection:

A customer subscribes to the communication network and either he or the dealer of the shop chooses a subscriber identity module for him from the list of available subscriber identity modules. Then, the dealer at the shop with IP connection 2b issues an enabling request to the database entity of the second type, i.e. to the pre-provisioning center 4, via the IP connection between the shop and the pre-provisioning center 4, as indicated by an arrow denoted with S2b. This enabling request forwarded to the database entity 4 of the second type triggers the database entity of the second type for performing a transfer. That is, the request contains the identity of the sold subscriber identity module and/or subscriber entity, and the subscriber identity assigned thereto is transferred from the database 4 of the second type to a selected one of said at least one database entity (5a, 5b) of the first type. Stated in other words, one data set out of the records of subscriber data kept at the pre-provisioning center 4 is transferred from the pre-provisioning center 4 to a selected one of the home location registers HLR/home subscriber servers HSS 5a or 5b. In FIG. 1, this is illustrated by an arrow denoted with S3. In the illustrated example, HLR/HSS 5b has been selected. The HLR/HSS 5b, as indicated by arrow S4, acknowledges the receipt of the assigned subscriber identity and the other data necessary to be maintained at the HLR/HSS for an enabled subscriber to the pre-provisioning center 4. The pre-provisioning center 4, as denoted by an arrow labeled S5, correspondingly informs the register entity SRR 3 of the transfer. This means that the pre-provisioning center 4 informs the SRR 3 at least of the transferred subscriber identity such as the IMSI and of the fact to which HLR/HSS the subscriber identity was transferred. Thus, the third type record at the register entity 3 is updated by setting the indication HLR-INDIC, that and to which HLR/HSS the subscriber identity has been transferred. Then, when the new subscriber to the communication network uses his subscriber entity (in combination with a terminal) which performs a location update upon being switched on, the location update request is routed from the MSC 1 via the SRR 3 to the corresponding HLR/HSS 5b, as indicated by arrow S6, to which the subscriber identity has been transferred.

Thus, the database entity of the second type is informed (from the shop with IP connection 2b) about a need to enable at least one not yet enabled subscriber entity to actively communicate in said communication network, and upon being informed, said at least one assigned subscriber identity of at least one subscriber entity not enabled is transferred from the database of the second type to a selected one of said at least one database entity of the first type. Thus, subscriber information is downloaded from the pre-provisioning center 4 to the HLR 5b upon request, the request being an enabling request issued from a remote location at which a subscriber subscribes to said communication network.

Case 2: Buying a SIM Card from a Shop without IP Connection:

Since the customer subscribed to the communication network at a shop as a remote location, which has no IP connection to the network, issuing of an enable request to the database entity of the second type originating from this shop is not possible.

Therefore, the new subscriber inserts his subscriber identity module SIM/subscriber entity into his subscriber terminal and switches his subscriber terminal on. Upon switching on his subscriber terminal with the ("new") subscriber entity for the first time, the subscriber terminal and/or entity performs a location update via the MSC 1 and the SRR 3 to a home location register/home subscriber server 5a, 5b.

Thus, the not-enabled subscriber entity requests a location update which is forwarded via the MSC 1 to the register entity SRR 3, as indicated by arrow labeled S1. Note that in case the network is an IP multimedia network, the location update may come from a call state control function (CSCF).

In that case the location update corresponds to a registration of the terminal/subscriber entity to the IP multimedia subsystem (IM subsystem). The registration can be carried in e.g. session initiation protocol (SIP) signalling. The register entity 3 thereafter detects that this location update request origins from a subscriber entity, for which an indication that that subscriber identity (with associated data) has been transferred to a selected one of that database entities of that first type, is not set in the record of the third type maintained at that register entity. This means that the register entity SRR 3 checks, upon receipt of a location update, whether for the IMSI identifying the origin/source (i.e. the subscriber entity) of the location update, an indication HLR-INDIC has been set or not. In response to the detection that no such indication has been set, the register entity SRR 3 triggers the database entity 4 of the second type, i.e. the pre-provisioning center 4, for performing the transfer. Triggering is indicated in FIG. 1 by an arrow labeled S2a. Thereafter, the same procedure as in connection with case 1 is executed. In brief, the pre-provisioning center 4 transfers the subscriber data associated with the IMSI from its records to a selected one of the home location registers/home subscriber servers, see arrow S3 in FIG. 1. The selected HLR/HSS 5b acknowledges the transfer, arrow S4 in FIG. 1. Thereafter, the pre-provisioning center informs, arrow S5, the register entity SRR 3 of the transfer and sets the HLR-INDIC in the third type record at the register entity 3 for the corresponding subscriber identity (e.g. IMSI) to a value indicating that and to which HLR/HSS the subscriber identity has been transferred. Thus, also in this case the database entity of the second type 4 is informed about the need to enable that at least one not-enabled subscriber entity to actively communicate in that communication network, and upon being informed, transferring that at least one assigned subscriber identity of at least one subscriber entity not enabled is performed from the database entity 4 of the second type to a selected one (5b) of that at least one database entities of the first type.

The difference between case 1 and case 2 resides in the origin of the information in that in case 1 an enabling request is issued from a remote location at which a subscriber subscribes to the communication network, whereas in case 2 the information is issued from a network entity such as the register entity 3 upon receipt of a location update for a subscriber terminal detected to be a subscriber terminal for which an indication that the subscriber identity has been transferred to a selected one of that at least one database entities of that first type is not set in the record of the third type at the register entity.

Thus, in the second case, the subscriber information could be transferred into the real infrastructure automatically and fast even without having a IP-connection from a shop to the network.

As concerns the selection of the database entity of the first type, to which the transfer of subscriber information is performed, this database entity of the first type may be selected according to available database storage capacity at a respective first type database entity. Alternatively or additionally, the selection may be based according to a service profile assigned to a subscriber terminal of a subscriber. This means, that for example a home location register/home subscriber server may be reserved for business users only, whereas an other home location register/home subscriber server may be reserved for ordinary users, and so on. In both cases as described herein above, new subscribers may be provisioned to the home subscriber server/home location register as the first type database of a communication network. Provisioning means that a subscriber entity is enabled to actively communicate in the communication network. The present invention is advantageously applicable in connection with a register entity such as a service routing register SRR. In particular, according to the present invention, a database entity of the second type such as pre-provisioning center 4 is added to existing communication network infrastructure. The database entity of the second type is storing predefined subscriber templates including subscriber identification information as well as profiles for a subscriber. Whenever a new subscriber is needed, i.e. a subscriber identity module and/or subscriber entity is activated, a subscriber template is obtained from the database entity of the second type and transferred and stored to the database entity of the first type (HLR/HSS). When the register entity SRR is used, all elements in the records of subscribers in the SRR-side are already available even before an activation of a (new) subscriber identity module. The only difference is that an indication, at which home location register/home subscriber server the subscriber is registered (a HLR/HSS node address) is missing or present from the subscriber record elements in the SRR. Subscriber entity activation and/or enabling may be performed according to two options. In the first option, an enabling request as an activation command is issued from a shop with an IP-connection to the pre-provisioning center, while in the second option, the activation of the new entity not yet enabled causes a location update, via the SRR to the HSS. In this case, the register entity SRR triggers the pre-provisioning center, the pre-provisioning center updates the HSS-subscriber data and also updates the subscriber record elements at the SRR.

It should be noted here that in case 1 as described above, the register entity SRR may also be removed from the communication network, since in case of a location update by a subscriber terminal registered to a HLR/HSS by the pre-provisioning center 4 in response to an enabling request from a shop, the register entity SRR is not inevitably necessary.

Also, it should be noted that the database entities of the first type (HLR/HSS) need not necessarily be physically separate as shown in FIG. 1. They could also be physically in a same database, while, however, they are required to be logically distinct from each other. The same applies for the distinctness of the first type database, the second type database and the register entity. That is, also these entities could be physically in the same equipment, as long as they are logically distinct and/or separated from each other.

Also, a subscriber entity could be identified by another information than the IMSI and/or MSISDN, as long as the subscriber is unambiguously identified by the information.

Herein before, the main focus has been laid on the description of the functional behavior of the entire communication network. Subsequently, hardware related details of the pre-provisioning center 4 as a database entity of a second type as well as of the service routing register SRR 3 as a register entity are described with reference to FIGS. 2 and 3, respectively.

Figure 2:
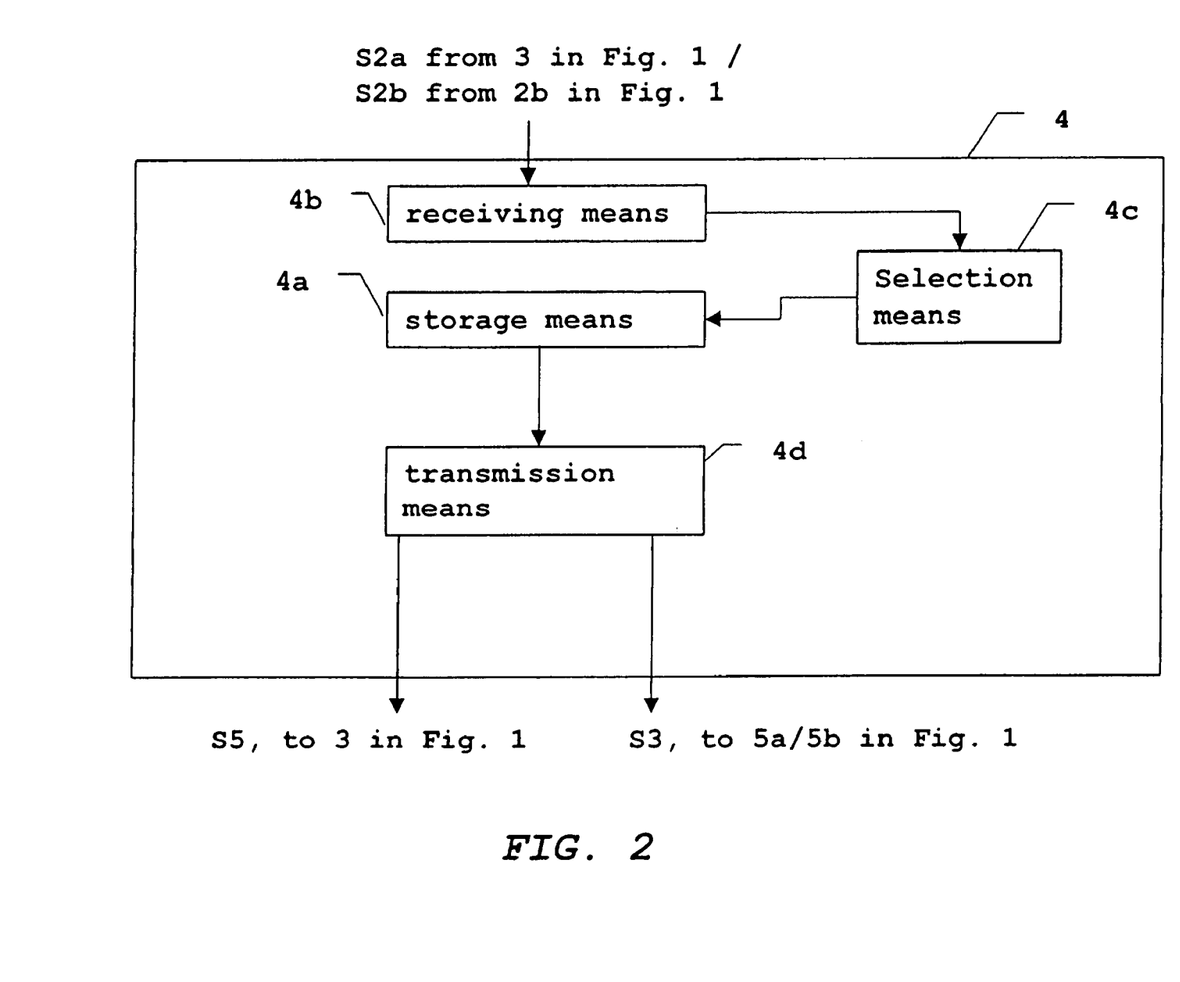
FIG. 2 shows details of the internal structure of the pre-provisioning center as a database entity of a second type.

FIG. 2 shows details of the pre-provisioning center 4 as a database entity of a second type. Note that the database entity of the second type is fully adapted to carry out the method according to the present invention even though the following hardware description does not mention every method orientated aspect.

As shown in FIG. 2, the database entity of a second type 4 in the communication network comprises a storage means 4a adapted to store at least one assigned subscriber identity of at least one subscriber entity not enabled to actively communicate in said communication network. Also, a receiving means 4b is provided which is adapted to receive a request S2a and/or S2b (originating from entity 2 or 2b in FIG. 1) indicating that a specific one of said at least one assigned subscriber identity of at least one subscriber entity not enabled is to be enabled. Still further, there are selection means 4c adapted to select, based on said request, said specific one of said subscriber identities from said storage means 4a. And further the database entity 4 of the second type comprises transmission means 4d adapted to transfer S3 said selected specific one of said subscriber identities to a selected database entity of a first type 5a, 5b of said network. Note that said transmission means is further adapted to send S5 an indication of said selected specific one of said subscriber identities being transferred to a selected database entity of said first type 5a, 5b of said network, to a register entity 3 of said network.

Figure 3:
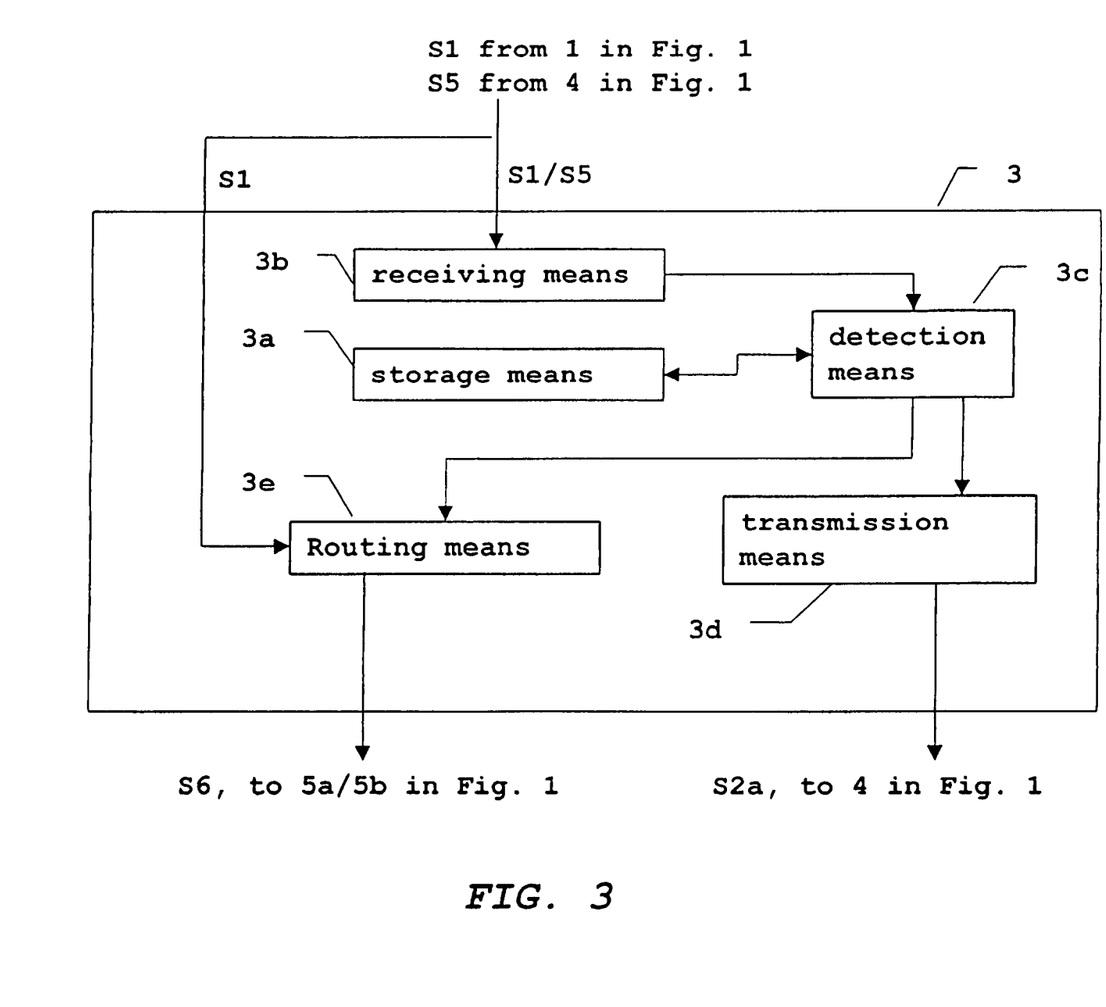
FIG. 3 shows details of the internal structure of the service routing register SRR as a register entity.

FIG. 3 shows details of the service routing register SRR 3 as the above mentioned register entity. Also here it is to be noted that the register entity is fully adapted to carry out the method according to the present invention even though the following hardware description does not mention every method orientated aspect.

The register entity 3 in the communication network, comprises storage means 3a keeping a record including information related to enabled and not enabled subscriber entities, said record comprising, for each subscriber entity, said at least one assigned subscriber identity and an indication HLR-INDIC whether said subscriber identity has been transferred to a selected one 5a, 5b of at least one database entity of a first type. Also there is provided a receiving means 3b adapted to receive a request (S1 from entity 1 in FIG. 1) for a location update by at least one subscriber entity, and a detection means 3c which is adapted to detect whether said location update request S1 origins from a not enabled subscriber entity for which said indication that said subscriber identity has been transferred to a selected one of said at least one database entity 5a, 5b of said first type, is not set in said record kept at said storage means 3a. To this end, the detection means 3c is adapted to compare the received request S1 with information retrieved from said storage means 3a. Furthermore, the register entity 3 includes transmission means 3d, responsive to said detection means 3c, which transmission means 3d are adapted to trigger (S2a to entity 4 in FIG. 1) a database entity 4 of a second type of said communication network storing said at least one assigned subscriber identity of said at least one subscriber entity not enabled to actively communicate in said communication network, to transfer (S3 in FIG. 1) information related to said subscriber identity not enabled to a selected database entity of said first type 5a, 5b of said network.

Still further, said receiving means 3b is adapted to receive a request for setting (S5 from entity 4 in FIG. 1) said indication for said subscriber identity that has been transferred to a selected one 5b of said at least one database entity of said first type. In this case, the detection means 3c is adapted to accordingly perform also the setting operation to the storage means 3a. Stated in other words, the detection means analyses the requests S1, S5 received at the receiving means and upon analysis suitably processes the requests in accordance with the previously described method.

The register entity 3 further comprises also a routing means 3e adapted to route (S6 in FIG. 1) the location update request S1 to a corresponding database entity of said first type 5b to which the subscriber identity has been transferred, based on said set indication (which has been detected to be set by said detection means 3c).

Accordingly, as has been described herein above, the present invention proposes a method for enabling a subscriber entity to actively communicate in a communication network, a subscriber entity being identified by at least one assigned subscriber identity, said communication network comprising at least one database entity of a first type keeping a record of a first type of data of subscriber entities enabled to actively communicate in a communication network, the method comprising the steps of: storing said at least one assigned subscriber identity of at least one subscriber entity not enabled to actively communicate in said communication network in a database entity of a second type keeping a record of a second type, informing said database entity of said second type about a need to enable said at least one not enabled subscriber entity to actively communicate in said communication network, and, upon being informed, transferring information related to a subscriber entity not enabled, from said database of said second type to a selected one of said at least one database entity of said first type. Also, the present invention proposes an accordingly adapted database entity of the above mentioned second type and a register entity for interaction with said database entity of said second type.

Although the present invention has been described herein above with reference to its preferred embodiments, it should be understood that numerous modifications may be made thereto without departing from the spirit and scope of the invention. It is intended that all such modifications fall within the scope of the appended claims.

What is claimed is:

1. A method for enabling a subscriber entity to actively communicate in a communication network,
   a subscriber entity being identified by at least one assigned subscriber identity,
   said communication network comprising at least one database entity of a first type keeping a first record of data of subscriber entities enabled to actively communicate in a communication network,
   the method comprising the steps of:
   storing said at least one assigned subscriber identity of at least one subscriber entity not enabled to actively communicate in said communication network in a database entity of a second type,
   informing said database entity of said second type about a need to enable said at least one not enabled subscriber entity to actively communicate in said communication network, and, upon being informed,
   transferring information related to a subscriber entity not enabled, from said database of said second type to a selected one of said at least one database entity of said first type;
   wherein said communication network further comprises a register entity keeping a record of a third type including enabled and not enabled subscriber entities,
   said third record comprising, for each subscriber entity, said at least one assigned subscriber identity and an indication whether said subscriber identity has been transferred to a selected one of said at least one database entity of said first type,
   said method comprising a further step of:
   setting said indication for said subscriber identity that has been transferred to a selected one of said at least one database entity of said first type, and wherein
   said indication comprises an identification of said database entity of said first type to which said transfer has been effected.

2. A method according to claim 1, wherein said step of informing comprises
   requesting a location update by said at least one not enabled subscriber entity,
   detecting, at said register entity, that said location update request origins from a subscriber entity for which an indication that said subscriber identity has been transferred to a selected one of said at least one database entity of said first type, is not set in said record of said third type, and
   in response thereto,
   triggering said database entity of said second type for performing said transfer.

3. A method according to claim 1, wherein said step of informing comprises
   issuing an enabling request to said database entity of said second type triggering said database entity of said second type for performing said transfer.

4. A method according to claim 3, wherein said enabling request is issued from a remote location at which a subscriber subscribes to said communication network.

5. A method according to claim 1, wherein said database entity of said first type to which said transfer is performed, is selected according to the available database storage capacity at said first type database entity.

6. A method according to claim 1, wherein said database entity of said first type to which said transfer is performed, is selected according to a service profile assigned to a subscriber terminal of a subscriber.

7. A register entity in a communication network, comprising:
   storage means keeping a record including information related to enabled and not enabled subscriber entities, said record comprising, for each subscriber entity, said at least one assigned subscriber identity and an indication whether said subscriber identity has been transferred to a selected one of at least one database entity of a first type,
   receiving means adapted to receive a request for a location update by at least one subscriber entity,
   detection means adapted to detect whether said location update request origins from a not enabled subscriber entity for which said indication that said subscriber identity has been transferred to a selected one of said at least one database entity of said first type, is not set in said record kept at said storage means, and
   transmission means, responsive to said detection means, adapted to trigger a database entity of a second type of said communication network storing said at least one assigned subscriber identity of said at least one subscriber entity not enabled to actively communicate in said communication network, to transfer information related to said subscriber identity not enabled to a selected database entity of said first type of said network.

8. A register entity according to claim 7, wherein said receiving means is further adapted to receive a request for setting said indication for said subscriber identity that has been transferred to a selected one of said at least one database entity of said first type.

9. A register entity according to claim 7, further comprising routing means adapted to route the location update request to a corresponding database entity of said first type to which the subscriber identity has been transferred, based on said set indication.

* * * * *